Figure 1:
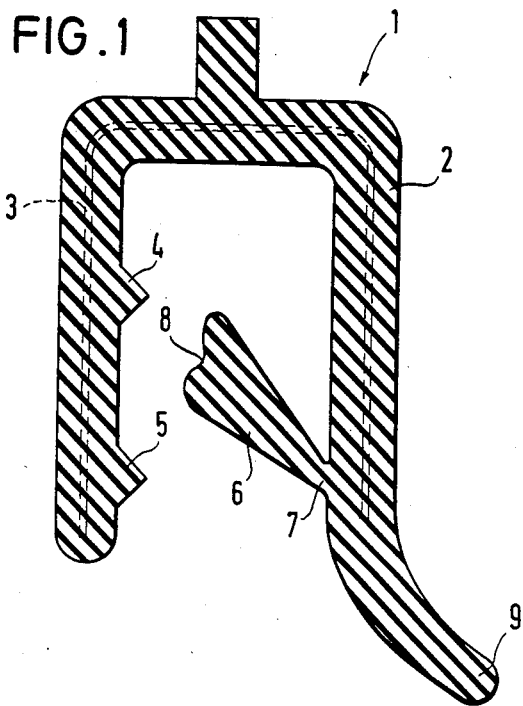

United States Patent [19]
Kranz

[11] Patent Number: 4,744,570
[45] Date of Patent: May 17, 1988

[54] SEALING PROFILE WITH U-SHAPED CROSS-SECTION AND INSIDE SEALING LIPS

[75] Inventor: Jürgen Kranz, Lindau/Bodolz, Fed. Rep. of Germany

[73] Assignee: Metzeler Kautschuk GmbH, Munich, Fed. Rep. of Germany

[21] Appl. No.: 81,186

[22] Filed: Aug. 4, 1987

[30] Foreign Application Priority Data

Aug. 5, 1986 [DE] Fed. Rep. of Germany ....... 3626457

[51] Int. Cl.⁴ .......................... F16J 15/12; E06B 7/23
[52] U.S. Cl. .................................... 277/184; 277/205; 296/93; 49/490
[58] Field of Search .................. 277/184, 205, 206 R, 277/207 R, 207 A, 208–210; 49/490, 491, 496; 296/93

[56] References Cited

U.S. PATENT DOCUMENTS 2,625,716  1/1953  Beck .................................. 296/93 X
4,014,556  3/1977  Anderson .................. 277/207 A X

FOREIGN PATENT DOCUMENTS 824748  12/1951  Fed. Rep. of Germany ........ 296/93
916501  8/1954   Fed. Rep. of Germany ........ 296/93
57-58509 4/1982  Japan ..................................... 296/93
2006309  5/1979  United Kingdom .................. 49/490

Primary Examiner—Robert S. Ward
Attorney, Agent, or Firm—Herbert L. Lerner; Laurence A. Greenberg

[57] ABSTRACT

A sealing profile includes a basic body being formed of elastomeric material and having a U-shaped cross section defining an inner surface thereof with sides. A metallic reinforcement inlay is disposed in the basic body. Sealing lips are integrally formed on the inner surface of the basic body. At least one of the sealing lips on one of the sides of the inner surface of the basic body is formed of the same material as the basic body. The at least one sealing lip has a substantially triangular cross section defining corners and an enlarged head surface. One of the corners pivotally connects the at least one sealing lip to the basic body. The enlarged head surface of the sealing lip has a concavely curved recess formed therein.

5 Claims, 1 Drawing Sheet

SEALING PROFILE WITH U-SHAPED CROSS-SECTION AND INSIDE SEALING LIPS

The invention relates to a sealing profile having a basic body formed of elastomeric material with a U-shaped cross section and a metallic reinforcement inlay, as well as sealing lips integrally formed on the inside of the basic body.

A sealing profile of this type is known, for instance, from German Published, Prosecuted Application DE-AS No. 17 59 699. In that device the sealing lips on either inner side of the basic body have different sizes and are made of a softer plastic or rubber than the basic body. Although sealing lips of this kind which are made of a softer material do provide good contact with a profiled metal sheet slipped between them, they only offer slight resistance to pulling off or loosening the sealing profile. In order to improve the seating of such a sealing profile, it is known from German Published, Non-Prosecuted Application DE-OS No. 32 39 972 to provide the sealing lip on one side of the basic body in the form of a pivotably attached head portion with a convex, spiral contact surface. In order to obtain a firm seating in such a case, an incorporated mounting cord divides the head portion into an upper and a lower section, which are joined at a predetermined breaking point that can be torn apart with the aid of the mounting cord after the profiled strip is slipped onto the flange. This means that the firm seating is not attained until the mounting cord is pulled downward, thus pressing the head portion against the edge of the metal sheet that is to be sealed. However, this only is attained with a considerable construction cost and poses considerable manufacturing problems, which may be quite difficult to solve, especially given a typical total gap width of the basic body on the order of magnitude of 6 mm.

It is accordingly an object of the invention to provide a sealing profile, which overcomes the hereinafore-mentioned disadvantages of the heretofore-known devices of this general type and which on one hand can be slipped quite easily onto the sheet-metal edge that is to be sealed, but on the other hand is seated there quite firmly and cannot be pulled off the sheet-metal edge again unless considerable force is expended.

With the foregoing and other objects in view there is provided, in accordance with the invention, a sealing profile, comprising a basic body being formed of elastomeric material and having a U-shaped cross section defining an inner surface thereof with sides or flanks, a metallic reinforcement inlay disposed in the basic body, sealing lips integrally formed on the inner surface of the basic body, at least one of the sealing lips on one of the sides of the inner surface of the basic body being formed of the same material as the basic body, the at least one sealing lip having a substantially triangular cross section defining corners and an enlarged head surface, one of the corners pivotally connecting the at least one sealing lip to the basic body, and the enlarged head surface of the sealing lip having a concavely curved recess formed therein.

With this kind of construction of the sealing lip, it is very easy to slip the sealing lip onto a sheet-metal edge, because the sealing lip folds slightly inward, due to the very narrow web connecting it with the basic body, yet when pulling the sealing lip off, it automatically and very readily becomes wedged against the profiled metal sheet, thus presenting considerable resistance to being pulled off.

In accordance with another feature of the invention, the enlarged head surface of the triangular sealing lip extends obliquely at an angle relatively to a central plane of the U-shaped basic body, in an unstressed state.

In accordance with a further feature of the invention, the sealing lips include two bead-like sealing lips disposed on another of the sides of inner surface of the U-shaped basic body other than the one side of the inner surface on which the triangular sealing lip is disposed.

However, in accordance with an added feature of the invention, it is also possible for the sealing lips to include a plurality of mutually parallel sealing lips on each of the sides of the inner surface of the U-shaped basic body.

In accordance with a concomitant feature of the invention, the U-shaped basic body has a longer leg and a shorter leg, the longer leg being in the form of a protruding, flexible, sealing strip.

Other features which are considered as characteristic for the invention are set forth in the appended claims.

Although the invention is illustrated and described herein as embodied in a sealing profile, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
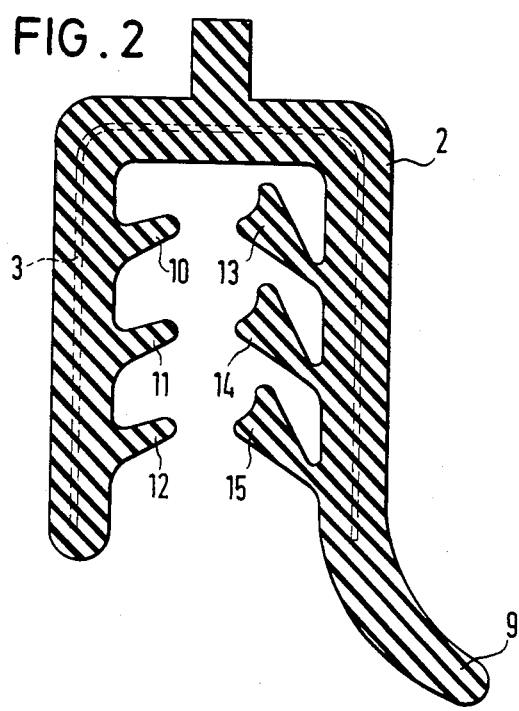

FIG. 1 is a diagrammatic, cross-sectional view of a sealing profile having a triangular sealing lip; and FIG. 2 is a cross-sectional view of a sealing profile having a plurality of sealing lips.

Referring now to the figures of the drawings in detail and first, particularly, to FIG. 1 thereof, there is seen a sealing profile 1 having a U-shaped basic body 2 with a metal reinforcement inlay 3. Two small bead-like sealing lips 4 and 5 are formed inside the basic body 2 on one inner surface thereof, while a larger, approximately triangular sealing lip 6 is pivotably connected to the other inner surface by a narrow connecting web 7 forming a corner of the triangle. The sealing lip 6 has an enlarged head region provided with a concavely curved recess 8. In the unstressed state, as a whole the surface of the head extends obliquely relative to an imaginary center line of the U-shaped basic body 2.

The sealing lip 6 presents only slight resistance to slipping the sealing profile 1 onto a non-illustrated sheet-metal edge, because on one hand there is only a small contact surface area and hence a small friction surface area between the metal sheet to be inserted and the sealing lip 6, and on the other hand the sealing lip 6 folds inward. However, when the sealing profile 1 is pulled off, the sealing lip 6 becomes wedged against the sheet-metal edge and thus presents considerable resistance to being pulled off. Since the sealing lip is integral with and hence is formed of the same material as the basic body 2, it is also relatively rigid and cannot roll off but instead acts like a true wedge, so that it cannot be pulled off except with considerable effort. Due to the construction of the sealing lip 6 and the disposition thereof in the basic body 2, the same wedging action is attained even with metal sheets of different thickness, so that a profile of this kind is quite universally usable.

In the embodiment illustrated in FIG. 2, the basic body 2 has three conventional sealing lips 10, 11 and 12, tapering to a point on one inner surface, while three triangular sealing lips 13, 14 and 15 are provided on the other inner surface. With this kind of structure, an even firmer seat as well as better sealing against the infiltration of moisture, are reliably assured.

Furthermore, one of the legs of the U-shaped basic body 2 can be lengthened in a conventional manner into a protruding, flexible sealing strip 9. This additional sealing strip may also protrude from any other point of the basic body 2 of the sealing profile.

The overall result is a sealing profile that can be slipped on very easily and which no longer requires three different grades of rubber for the basic body and the lips, as in conventional profiles, because the sealing lips are made of the same material as the basic body itself. Furthermore, the fact that the sealing lips have enlarged heads which are integrally joined to the basic body make them easier to manufacture than lips that taper to a point and they present considerably greater resistance to being pulled off, because of their clamping action.

I claim:

1. Sealing profile, comprising a basic body being formed of elastomeric material and having a U-shaped cross section defining an inner surface thereof with sides, a metallic reinforcement inlay disposed in said basic body, sealing lips integrally formed on said inner surface of said basic body, at least one of said sealing lips on one of said sides of said inner surface of said basic body being formed of the same material as said basic body, said at least one sealing lip having a substantially triangular cross section defining corners and an enlarged head surface, one of said corners pivotally connecting said at least one sealing lip to said basic body, and said enlarged head surface of said sealing lip having a concavely curved recess formed therein.

2. Sealing profile according to claim 1, wherein said enlarged head surface of said triangular sealing lip extends obliquely relatively to a central plane of said U-shaped basic body, in an unstressed state.

3. Sealing profile according to claim 2, wherein said sealing lips include two bead-like sealing lips disposed on another of said sides of inner surface of said U-shaped basic body other than said one side of said inner surface on which said triangular sealing lip is disposed.

4. Sealing profile according to claim 2, wherein said sealing lips include a plurality of mutually parallel sealing lips on each of said sides of said inner surface of said U-shaped basic body.

5. Sealing profile according to claim 1, wherein said U-shaped basic body has a longer leg and a shorter leg, said longer leg being in the form of a protruding, flexible, sealing strip.

* * * * *